United States Patent [19]

Turnbo et al.

[11] 4,107,230

[45] Aug. 15, 1978

[54] FLAME-RETARDANT THERMOSETTING RESINOUS COMPOSITIONS

[75] Inventors: Roy G. Turnbo, Deer Park, Tex.; David C. Purpi, Woodcliff Lake, N.J.

[73] Assignee: Tenneco Chemicals, Inc., Saddle Brook, N.J.

[21] Appl. No.: 467,884

[22] Filed: May 8, 1974

[51] Int. Cl.$^2$ .............................. C08K 5/02
[52] U.S. Cl. .................. 260/861; 260/45.7 R; 260/45.75 B; 260/47 EC; 260/837 R; 260/847; 260/853; 260/869; 528/88; 528/124
[58] Field of Search ........... 260/2 EP, 45.7 R, 861, 260/869, 2 EC, 47 EC

[56] References Cited

U.S. PATENT DOCUMENTS

| | | |
|---|---|---|
| 2,863,848 | 12/1958 | Robitschek et al. .......... 260/869 |
| 2,909,501 | 10/1959 | Robitschek et al. .......... 260/40 |
| 3,001,954 | 9/1961 | Buchholz et al. ............ 260/2.5 |
| 3,159,655 | 12/1964 | Tousignant ................. 260/348 |
| 3,455,873 | 7/1969 | Jenkner ................... 260/45.7 |
| 3,666,692 | 5/1972 | Paige et al. ............... 260/2.5 |
| 3,707,561 | 12/1972 | Sobel et al. .............. 260/570.7 |
| 3,775,367 | 11/1973 | Nouvertne ................. 260/45.9 |
| 3,819,547 | 6/1974 | Pillar et al. .............. 260/2.5 |

FOREIGN PATENT DOCUMENTS 966,976  8/1964  United Kingdom.

*Primary Examiner*—Donald E. Czaja
*Assistant Examiner*—R. A. White
*Attorney, Agent, or Firm*—Evelyn Berlow

[57] ABSTRACT

1,1,2,3,4,4-Hexabromobutene-2 is used to impart flame-retardance to epoxy resins, polyesters, and other thermosetting organic polymers that are normally susceptible to burning.

17 Claims, No Drawings

FLAME-RETARDANT THERMOSETTING RESINOUS COMPOSITIONS

This invention relates to flame-retardant resinous compositions. More particularly, it relates to thermosetting organic polymer compositions that contain a flame-retarding amount of 1,1,2,3,4,4,-hexabromobutene-2.

Thermosetting organic polymers are used in the preparation of a broad range of consumer and industrial products. As ordinarily prepared, these polymers are readily ignitable and flammable. Because of the fire hazard inherent in their use, it is necessary that compositions containing these polymers be rendered flame-retardant. A number of halogenated organic compounds have been suggested as flame-retardants for organic polymers, but none has proven to be entirely satisfactory in this application. while many of the halogenated compounds are effective in improving the flame-retardance of the polymers, they usually have an adverse effect on the properties of the polymers when they are used in amounts sufficient to impart to them the desired degree of flame-retardance. In addition, many of the halogenated compounds are volatile or unstable, and polymer compositions containing them lose their flame-retardance with the passage of time.

In accordance with this invention, it has been found that 1,1,2,3,4,4-hexabromobutene-2 is a very effective flame-retarding agent for thermosetting organic polymer compositions.

1,1,2,3,4,4-Hexabromobutene-2, which has the structural formula

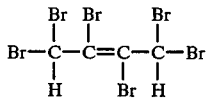

has a combination of properties that makes it particularly valuable as a flame-retardant for thermosetting organic resinous compositions. It is a crystalline compound that melts at about 180° C. and that contains 90 percent by weight of bromine. Because it is nonvolatile, stable, and insoluble in water and most common organic solvents, hexabromobutene-2 cannot be separated from the polymer compositions by leaching, washing, or evaporation. In addition, hexabromobutene-2 is non toxic, non-irritating, and biodegradable.

1,1,2,3,4,4-Hexabromobutene-2 is commercially available as a mixture that contains about 85 to 95 percent of the trans isomer and 5 to 15 percent of the cis isomer. The trans isomer is insoluble in water and in most organic solvents; the cis isomer is moderately soluble in acetone and certain other organic solvents. While the cis and trans isomers can be separated and used individually as the flame-retardant in the compositions of this invention, it is preferred for reasons of economy and performance that a mixture of isomers that contains about 90 percent of the trans isomer and 10 percent of the cis isomer be used.

1,1,2,3,4,4-Hexabromobutene-2 can be prepared easily and in good yield by the bromination of diacetylene. This reaction can be conveniently and safely carried out by contacting a gas stream that contains about 20 to 40 mole percent of diacetylene in an inert gas, such as nitrogen, with a dilute solution of bromine in water, carbon tetrachloride, or another inert solvent. The product of this reaction is a mixture of polybrominated compounds that contains about 75 to 80 percent by weight of 1,1,2,3,4,4-hexabromobutene-2, 15 to 23 percent by weight of 1,1,2,4-tetrabromobutene-2, and small amounts of dibromobutadienes. The crystalline hexabromobutene-2 may be separated from the product mixture by filtration. Hexabromobutene-2 prepared in this way contains 85 to 95 percent of the trans isomer and 5 to 15 percent of the cis isomer, and usually about 90 percent of the trans isomer and 10 percent of the cis isomer. This isomer mixture can be used without further treatment as the flame-retardant in thermosetting organic polymer compositions.

1,1,2,3,4,4-Hexabromobutene-2 can be used to impart flame-retardance to a wide variety of normally-flammable thermosetting organic resins including epoxy resins, polyesters, phenol-aldehyde resins, aminoaldehyde resins, and mixtures of these resins. It is of particular value as the flame-retardant in compositions that contain epoxy resins or polyesters.

The epoxy resins in which 1,1,2,3,4,4-hexabromobutene-2 can be used as the flame-retardant are polyethers resulting from the condensation of a halogen-containing epoxide, such as epichlorohydrin, with a polyhydric phenol or a polyhydric alcohol. They may be saturated or unsaturated, aliphatic, cycloaliphatic, aromatic, or heterocyclic; they may be substituted with chlorine or bromine atoms, hydroxyl groups, or amine groups. The epoxy resins generally have epoxide equivalent weights in the range of 170 to 250 and average molecular weights in the range of 200 to 2000; they preferably have epoxide equivalent weights in the range of 175 to 210 and average molecular weights in the range of 350 to 600.

The epoxy resins that are polyethers of polyhydric phenols may be prepared by reacting a phenol, such as catechol, resorcinol, 2,2-bis(4-hydroxyphenyl)propane, 2,2-bis(4-hydroxyphenyl)butane, or 4,4'-dihydroxybiphenyl, with epichlorohydrin in an alkaline medium at a temperature between 50° and 150° C. The epoxy resins that are polyethers of polyhydric alcohols may be prepared by reacting an alcohol, such as ethylene glycol, neopentyl glycol, glycerol, trimethylolethane, trimethylolpropane, or pentaerythritol, with epichlorohydrin in the presence of an acidic material, such as boron trifluoride, and subsequently treating the resulting polymer with an alkaline material. For most applications, the preferred epoxy resins are those prepared by the reaction of epichlorohydrin with bisphenol A [bis(4-hydroxyphenyl)dimethylmethane].

Conventional curing agents, for example, polyfunctional amines, phenols, acids, and anhydrides, are added to the epoxy resin, and the resulting compositions are cured by known techniques. Such amine curing agents as triethylenetetramine and methylene dianiline are generally preferred because they react with 1,1,2,3,4,4-hexabromobutene-2 and thereby incorporate it chemically into the cured resinous compositions.

Thermosetting polyester resins that are flame retardant and that have high resistance to heat are of considerable commercial importance. Such resins are required, for example, in the production of moldings, castings, and laminated structures that are to be used in the manufacture of electrical components or in many applications by the boating industry. These resins, which are ethylenically-unsaturated, cross-linkable polyesters are generally the products of the condensation of an α,β-ethylenically-unsaturated dicarboxylic acid with a polyhydric alcohol, and optionally a dicarboxylic acid that is free of ethylenic unsaturation. These unsaturated polyesters may be cross-linked using a peroxide catalyst in the presence or absence of a cross-linking agent, such as styrene, methyl methacrylate, or allyl acetate.

Among the α,β-ethylenically-unsaturated dicarboxylic acids that can be used in the preparation of the unsaturated polyesters are maleic acid, fumaric acid, itaconic acid, aconitic acid, and citraconic acid, and mixtures thereof. The useful polyhydric alcohols include ethylene glycol, diethylene glycol, polyethylene glycol, propylene glycol, glycerol, neopentyl glycol, trimethylolethane, trimethylolpropane, pentaerythritol, and mixtures thereof. The saturated dicarboxylic acid may be an aliphatic acid, such as adipic acid, succinic acid, or azelaic acid, or an aromatic acid, such as phthalic acid or terephthalic acid. The peroxide catalyst that is used to effect setting or curing of the polyester resin may be, for example, benzoyl peroxide, acetyl peroxide, or methyl ethyl ketone peroxide. In addition, the polyester resin usually contains an accelerator that is a metallic salt, such as cobalt naphthenate or manganese naphthenate; an aniline, such as dimethylaniline or diethylaniline; a mercaptan, such as dodecylmercaptan or mercaptoethanol, or a quaternary amine. It may also contain such additives as inhibitors, chain transfer agents, waxes, and the like.

Phenol-formaldehyde resins may also be rendered flame-retardant by incorporating 1,1,2,3,4,4-hexabromobutene-2 into them. These resins are prepared by the reaction of a phenol, such as phenol, cresol, xylenol, resorcinol, 4-butylphenol, or 4-phenyl-phenol, with an aldehyde, such as formaldehyde, acetaldehyde, or butyraldehyde.

Amino-aldehyde resins comprise another group of thermosetting resins that can be used in the compositions of this invention. These include the heat-convertible condensation products of formaldehyde or another aldehyde with urea, thiourea, guanidine, cyanamide, dicyandiamide, melamine, 2-chloro-4,6-diamino-1,3,5-triazine, or 2-hydroxy-4,6-diamino-1,3,5-triazine.

1,1,2,3,4,4-Hexabromobutene-2 can be incorporated into the polymer compositions by any convenient procedure. It is generally added as a finely-ground powder, 100 mesh size or finer, that can be dispersed in the resin by efficient stirring. It can be premixed with the resin or added to the polymer, curing agent, and other components of the compositions prior to the final curing step.

The amount of 1,1,2,3,4,4-hexabromobutene-2 that is incorporated into the polymer compositions is that which will impart the desired degree of flame retardance to the compositions without adversely affecting their physical properties. The addition of as little as 5 percent of hexabromobutene-2, based on the weight of the composition, results in a significantly reduced burn rate. In some compositions, 50 percent or more or hexabromobutene-2, based on the weight of the composition, can be used to achieve maximum flame retardance without harming the properties of the compositions. It is generally preferred that 15 percent to 30 percent of hexabromobutene-2, based on the weight of the polymer, be used in thermosetting organic polymer compositions.

The effectiveness of 1,1,2,3,4,4-hexabromobutene-2 as a flame-retardant may be enhanced by the use of a synergist that is an antimony compound, for example, antimony trioxide, antimony sulfide, antimony trichloride, antimony naphthenate, triphenylstibine, or bis-β-chlorovinylantimony chloride. The synergist, which is preferably antimony trioxide, is used in the amount of 0.1 part to 2.0 parts and preferably 0.2 part to 0.8 part by weight per part by weight of 1,1,2,3,4,4-hexabromobutene-2 in the composition.

In addition to the thermosetting resin, 1,1,2,3,4,4-hexabromobutene-2, and synergist, the compositions may contain such additives as fillers, pigments, dyes, antioxidants, and the like in the amounts ordinarily used for these purposes.

The invention is further illustrated by the following examples.

EXAMPLE 1

1,1,2,3,4,4-Hexabromobutene-2 was evaluated as a flame-retardant in a commercial epoxy resin comprising the reaction product of epichlorohydrin and bisphenol A and having an epoxide equivalent weight of 185 to 205 and an average molecular weight of 350 to 400 by the following procedure:

A mixture of 11 grams of the uncured epoxy resin and 5.5 grams of methylene dianiline was heated at 80° C. until a clear solution was obtained. To the solution was added 3.5 grams (21.2 PHR) of 100-mesh 1,1,2,3,4,4-hexabromobutene-2. The mixture was vigorously stirred for one minute, and a 3 gram portion of it was poured into a 60 mm.-diameter mold. The mold was heated at 80° C. for 2 hours and then at 150° C. for 2 hours. A 1.5 × 10 × 40 mm. strip, which had been cut from the casting, was tested by the procedure described in ASTM Method D-2863-60. The Limiting Oxygen Index of this composition was 25.5, which indicates moderate fire retardance.

EXAMPLE 2

A mixture of 14.1 grams of the epoxy resin described in Example 1 and 4.1 grams of methylene dianiline was heated at 80° C. until a clear solution was obtained. To this solution was added with efficient stirring 4.4 grams (24 PHR) of 100-mesh 1,1,2,3,4,4-hexabromobutene-2 and 2.2 grams (12 PHR) of 100-mesh antimony trioxide. A 3 gram sample of the mixture in a 60 mm.-diameter mold was cured at 80° C. for 2 hours and at 150° C. for 2 hours. A 1.5 × 10 × 40 mm. strip, which had been cut from the casting, had a Limiting Oxygen Index of 38, which indicates excellent fire retardance. During the LOI determination, the composition intumesced with no dripping.

EXAMPLE 3

To 22.8 grams of the epoxy resin described in Example 1 was added with thorough mixing 4.18 grams of 100-mesh 1,1,2,3,4,4-hexabromobutene-2 and 3.0 grams of 100-mesh antimony trioxide. To this mixture was added 2.7 grams of triethylenetetramine. A 3 gram sample of the mixture was added in a 60 mm.-diamter mold was cured at 50° C. for 5 minutes and then at 25° C. for 24 hours. A 1.5 × 10 × 40 mm. strip, which had been cut from the casting, had a Limiting Oxygen Index of 24.

COMPARATIVE EXAMPLE A

A mixture of 11 grams of the epoxy resin described in Example 1 and 5.5 grams of methylene dianiline was heated at 80° C. until a clear solution was obtained. A 3 gram portion of the solution was poured into a 60 mm.-diameter mold, which was heated at 80° C. for 2 hours and then at 150° C. for 2 hours. A strip of the casting was tested by the procedure described in ASTM Method D-2863-60. Its LOI was 21.5

EXAMPLE 4

1,1,2,3,4,4-Hexabromobutene-2 was evaluated as a flame-retardant in a commercial ethylenically-unsaturated, cross-linkable polyester resin that comprises the reaction product of maleic anhyydride, phthalic anhydride, and propylene glycol and that contains about 25 percent of styrene and small amounts of a cobalt promoter and a wax.

To 50 grams of the mixture of unsaturated polyester resin was added with efficient stirring 13.4 grams of finely-divided 1,1,2,3,4,4-hexabromobutene-2 and then 1 gram of methyl ethyl ketone peroxide. A 10 gram portion of the mixture was placed in a 60 mm.-diameter mold and curved at 75° C. for 15 minutes and then at 25° C. for 24 hours. The physical properties of the cured casting were substantially the same as those of a casting that did not contain 1,1,2,3,4,4-hexabromobutene-2 (the product of Comparative Example B). A 4 × 10 × 50 mm. strip cut from the cured casting was tested by the procedure described in ASTM Method D-2863-60. The Limiting Oxygen Index of this composition was 26, which indicates good fire retardance.

EXAMPLE 5

To 50 grams of the unsaturated polyester resin described in Example 4 was added with efficient stirring 13.4 grams of finely-divided 1,1,2,3,4,4-hexabromobutene-2 and 3.6 grams of finely-divided antimony trioxide and then 1 gram of methyl ethyl ketone peroxide. A 10 gram portion of the mixture was placed in a 60 mm.-diameter mold and cured at 75° C. for 15 minutes and then at 25° C. for 24 hours. The physical properties of the cured casting were substantially the same as those of a casting that did not contain 1,1,2,3,4,4-hexabromobutene-2 (the product of Comparative Example B). The Limiting Oxygen Index of this composition was 30.5, which indicates excellent fire retardancy.

COMPARATIVE EXAMPLE B

To 50 grams of the unsaturated polyester resin described in Example 4 was added 1 gram of methyl ethyl ketone peroxide. A 10 gram portion of the mixture was placed in a 60 mm.-diameter mold and cured at 75° C. for 15 minutes and then at 25° C. for 24 hours. The LOI of the cured resin was 20.5.

What is claimed is:

1. A flame-retardant resinous composition that comprises a thermoset organic polymer and a flame-retarding amount of 1,1,2,3,4,4-hexabromobutene-2.

2. A flame-retardant resinous composition as defined in claim 1 wherein the thermoset organic polymer is a member selected from the group consisting of epoxy resins, polyesters, phenol-aldehyde resins, amine-aldehyde resins, and mixtures thereof.

3. A flame-retardant resinous composition as defined in claim 1 wherein the organic polymer is a cured epoxy resin.

4. A flame-retardant resinous composition as defined in claim 1 wherein the organic polymer is the resin obtained by curing an ethylenically-unsaturated, cross-linkable polyester resin.

5. A flame-retardant resinous composition as defined in claim 1 that contains 5 percent to 50 percent, based on the weight of the polymer, of 1,1,2,3,4,4-hexabromobutene-2.

6. A flame-retardant resinous composition as defined in claim 1 that contains 15 percent to 30 percent, based on the weight of the polymer of 1,1,2,3,4,4-hexabromobutene-2.

7. A flame-retardant resinous composition as defined in claim 1 wherein the 1,1,2,3,4,4-hexabromobutene-2 is a mixture of isomers containing about 90 percent of the trans isomer and 10 percent of the cis isomer.

8. A flame-retardant resinous composition as defined in claim 1 that additionally contains 0.1 part to 2.0 parts by weight of an antimony compound per part by weight of 1,1,2,3,4,4-hexabromobutene-2.

9. A flame-retardant resinous composition as defined in claim 8 that contains 0.2 part to 0.8 part by weight of antimony trioxide per part by weight of 1,1,2,3,4,4-hexabromobutene-2.

10. A process for the production of flame-retardant compositions that comprises incorporating 5 percent to 50 percent by weight of 1,1,2,3,4,4hexabromobutene-2 into a composition comprising a thermosetting organic polymer.

11. The process of claim 10 wherein the thermosetting organic polymer is a member selected from the group consisting of epoxy resins, polyesters, phenol-aldehyde resins, aminealdehyde resins, and mixtures thereof.

12. The process of claim 11 wherein the thermosetting resin is an epoxy resin.

13. The process of claim 11 wherein the thermosetting resin is an ethylenically-unsaturated, cross-linkable polyester resin.

14. The process of claim 10 wherein the composition additionally contains a curing agent for said thermosetting organic polymer.

15. The process of claim 10 wherein 15 percent to 30 percent of 1,1,2,3,4,4-hexabromobutene-2, based on the weight of the polymer, is incorporated into the composition.

16. The process of claim 10 wherein 0.1 part to 2.0 parts by weight of an antimony compound per part by weight of 1,1,2,3,4,4-hexabromobutene-2 is incorporated into the composition.

17. The process of claim 16 wherein 0.2 part to 0.8 part by weight of antimony trioxide per part by weight of 1,1,2,3,4,4-hexabromobutene-2 is incorporated into the composition.

* * * * *